(12) United States Patent
Larner et al.

(10) Patent No.: US 7,620,304 B2
(45) Date of Patent: Nov. 17, 2009

(54) METHOD AND APPARATUS FOR REDUCING SHUTTER LAG IN A DIGITAL IMAGING DEVICE

(75) Inventors: Joel B. Larner, Fort Collins, CO (US); Gregory V. Hofer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 611 days.

(21) Appl. No.: 11/410,703

(22) Filed: Apr. 24, 2006

(65) Prior Publication Data

US 2007/0248341 A1 Oct. 25, 2007

(51) Int. Cl.
*G03B 17/00* (2006.01)

(52) U.S. Cl. ............................ 396/52; 396/130; 348/352

(58) Field of Classification Search .................. 396/130, 396/52; 348/208.12, 352
See application file for complete search history.

(56) References Cited

U.S. PATENT DOCUMENTS

| 5,548,370 | A  | * | 8/1996  | Nakamura et al. ............. 396/55 |
| 5,708,863 | A  | * | 1/1998  | Satoh et al. ..................... 396/52 |
| 6,721,013 | B1 | * | 4/2004  | Tsujino ........................ 348/345 |
| 2004/0130628 | A1 | * | 7/2004  | Stavely ...................... 348/208.4 |
| 2005/0157198 | A1 |   | 7/2005  | Larner et al. |
| 2005/0248660 | A1 | * | 11/2005 | Stavely et al. .......... 348/208.16 |

* cited by examiner

*Primary Examiner*—Christopher Mahoney

(57) ABSTRACT

A digital imaging device, such as a digital camera, minimizes shutter lag by determining some capture parameters, such as focus and exposure settings, before a user of the device has indicated that a photograph is to be taken. The parameters are updated when the device becomes substantially still before the indication that a photograph is to be taken.

17 Claims, 3 Drawing Sheets

METHOD AND APPARATUS FOR REDUCING SHUTTER LAG IN A DIGITAL IMAGING DEVICE

FIELD OF THE INVENTION

The present invention relates to digital imaging.

BACKGROUND

Shutter lag is a persistent problem for users of digital cameras. Shutter lag is the interval between the time that the camera user indicates that a photograph is to be taken and the time that the camera actually takes the photograph. During the interval, the camera may perform tasks such as automatic focusing and determining optimum exposure settings for the upcoming photograph. These operations take time—typically more time than in a conventional film camera—and the delay may lead to photographer frustration and missed photographic opportunities.

Previous cameras have addressed the problem of shutter lag in various ways. Many cameras use a two-position shutter button. Two states, S1 and S2, are entered sequentially as the shutter button is depressed. The S1 state occurs when the button is partially depressed, and the S2 state occurs when the button is fully depressed. The corresponding shutter button positions are sometimes also called S1 and S2. S1 is an indication that a photograph may be taken imminently, and S2 is an indication that a photograph is to be taken at once. In one previous method, focus and exposure are determined at S1 and "locked". The locked settings are then used to take a photograph when S2 is reached. This way, a knowledgeable user may focus, wait for the optimum scene composition, and then take a photograph with minimal further delay by pressing the shutter button to S2 because no further focus or exposure calculations are performed. However, this method is of little benefit when there is too little time to focus in advance, and does not help the casual "point and shoot" photographer who may wish to simply aim the camera and fully depress the shutter button expecting a photograph to be taken immediately.

In a second previous method, focus and exposure are continuously updated while the photographer is composing a photo, even before S1 is reached. The photograph may be taken immediately, even if S1 and S2 are traversed in rapid succession, using the most recent updated focus and exposure settings. However, motors used to drive the automatic focus mechanism consume significant electrical energy. Continuous updating of focus and exposure may drain the camera's batteries rapidly, also resulting in user frustration and missed photographic opportunities.

Pending U.S. patent application Ser. No. 10/762,872, by the same inventors as the present application and having a common assignee with the present application, describes a third method for minimizing shutter lag. In this method, sequential preliminary photographs, such as those used for a "live view" shown on a display on the camera, are analyzed to evaluate scene stability. Focus and exposure setting are performed upon each scene change, but are not re-performed while the scene remains stable. When the shutter button is pressed while the scene is stable, a photograph may be taken with minimal delay using the most recent settings. This method conserves battery capacity as compared with the second method above because the focus motors are driven only sporadically.

DETAILED DESCRIPTION

Figure 1:
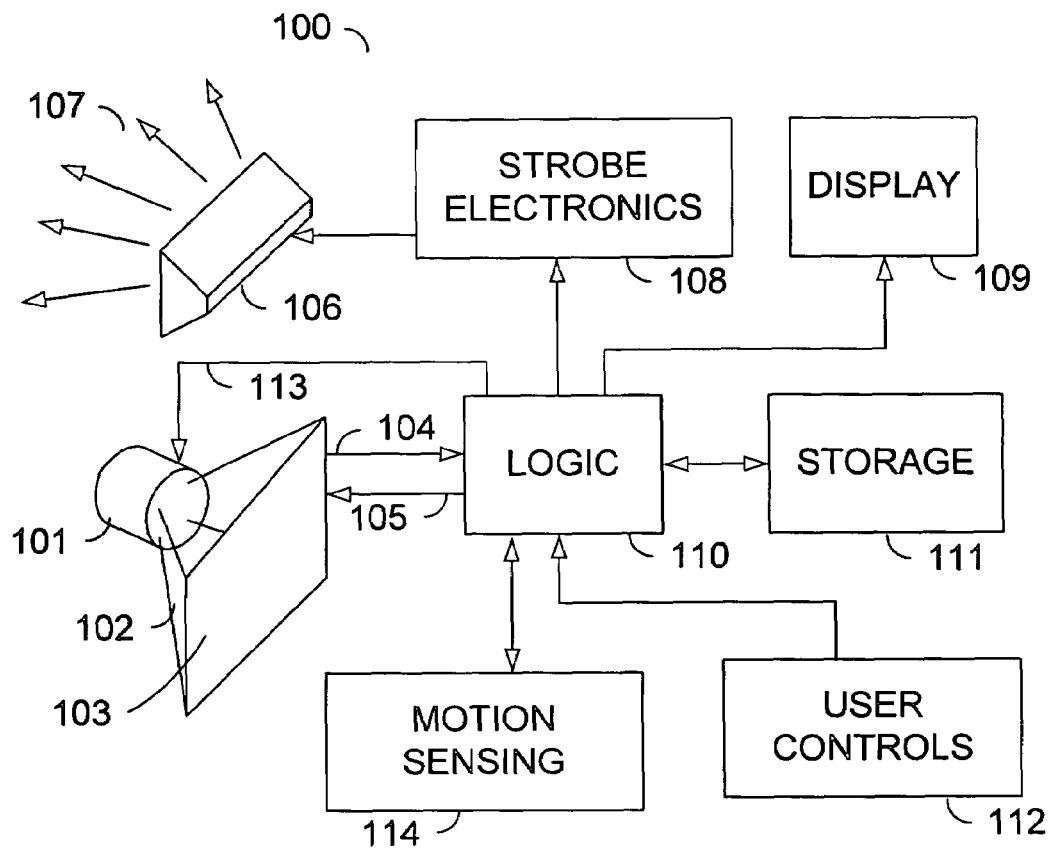
FIG. 1 shows a simplified block diagram of a digital camera in accordance with an example embodiment of the invention.

FIG. 1 shows a simplified block diagram of a digital camera 100, which serves as an example of a digital imaging device in accordance with an example embodiment of the invention. Lens 101 gathers light emanating from a scene, and redirects the light 102 to an electronic array light sensor 103. Sensor 103 comprises an array of light-sensitive elements, often called pixels. Each pixel on array 103 corresponds to a particular scene location by virtue of the operation of lens 101. A common type of electronic array light sensor generates, at each pixel, electric charge at a rate proportional to the intensity of light falling on the pixel, and stores these charges in charge coupled devices (CCDs). Such a sensor is often called a "CCD sensor", or simply a "CCD". Other kinds of sensors may be used as well, for example an active pixel complementary metal oxide semiconductor (CMOS) sensor. In many cameras, each sensor pixel also comprises a color filter so that color information about the scene is obtained. One of skill in the art will recognize that at least some aspects of the invention may be embodied in a camera with color capability or one without. Sensor 103 communicates image data signals 104 to logic 110. Logic 110 may comprise an analog to digital converter, a microprocessor or digital signal processor, or other kinds of circuitry, or any of these in any combination.

Logic 110 converts image data signals 104 to digital values representing the light intensities measured at the sensor pixel sites. An ordered array of these digital values, each representing the brightness, color, or both of a particular scene location, may be called a digital image, a digital photograph, or simply an image or a photograph. The digital values corresponding to pixel locations on sensor 103 may be called pixel values. When a digital image is properly interpreted and displayed, a representation of the original scene can be reproduced from the digital image.

Logic 110 may also perform other functions, such as generally controlling the operation of camera 100, controlling sensor 103 through control signals 105, interacting with a user of the camera through display 109 and user controls 112, processing digital images, and transmitting digital images to other equipment for processing, display, or printing. Logic 110 may perform automatic focusing by sending lens control signals 113 to lens 101.

A flash or strobe unit 106 may provide supplemental light 107 to the scene under the control of strobe electronics 108, which are in turn controlled by logic 110. Memory 111 provides storage for digital images captured by the camera, as well as for camera configuration information, for program instructions for logic 110, and for other items. Memory 111 may comprise non-volatile memory (such as flash memory), random access memory (RAM), read only memory (ROM), processor registers, or any combination of these and other kinds of memory. User controls 112 may comprise buttons, dials, switches, or other devices by which a user controls operation of camera 100.

Figure 2:
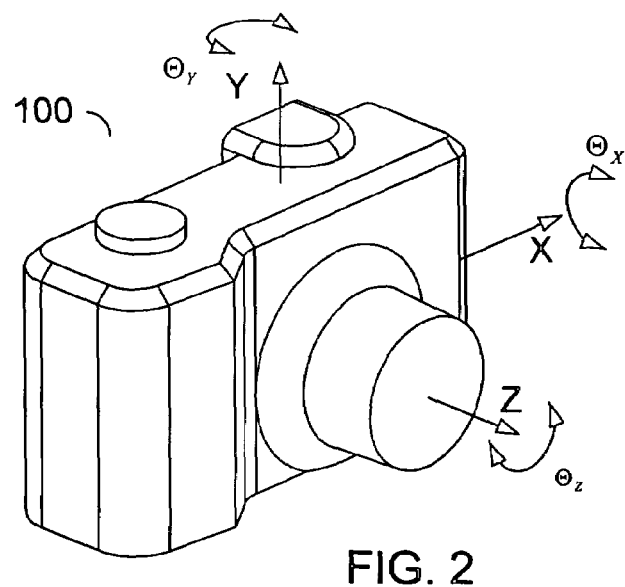
FIG. 2 shows a perspective view of the camera of FIG. 1 and illustrates a coordinate system convenient for describing camera motions.

Example camera 100 also comprises motion sensing module 114, which may but need not be part of an image stabilization system. Motion sensing module 114 detects motions of camera 100 that may significantly alter the camera's field of view. FIG. 2 shows a perspective view of camera 100 and illustrates a coordinate system convenient for describing camera motions. The primary motions of interest are rotations about the X and Y axes, designated $\Theta_x$ and $\Theta_y$, and often called pitch and yaw respectively, although other motions may be measured as well. For the purpose of this disclosure, sensing motion also encompasses sensing the absence of motion.

Figure 3:
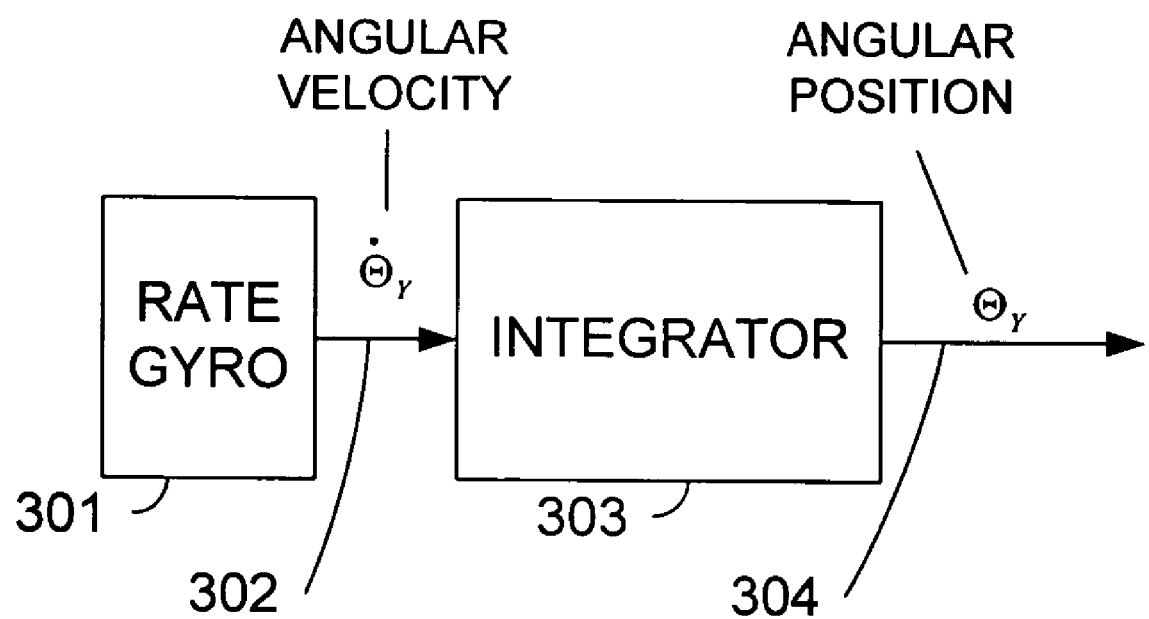
FIG. 3 shows a portion of the example camera of FIG. 1 in more detail.

FIG. 3 shows part of motion sensing module 114 in more detail. The system of FIG. 3 measures camera rotation about the Y axis. A similar set of components may be used to measure rotation about the other axes. In this example embodiment, camera rotation is sensed by rate gyroscope 301. Rate gyroscope 301 may be, for example, a EMC-03MA rate gyroscope available from Murata Manufacturing Co., Ltd., of Kyoto, Japan. Rate gyroscope 301 produces a signal 302 indicating the angular velocity of camera 100. Angular velocity signal 302 passes to integrator 303, which integrates the signal and produces angular position signal 304. Integrator 303 may be an analog circuit, or the integration may be performed digitally by camera logic 110. By examining angular position signal 304, logic 110 can determine whether camera 100 has moved, and if so by how much.

Many other arrangements are possible. For example, motion could be sensed using an accelerometer rather than a rate gyroscope. Logic 110 could examine angular velocity signal 302 directly and infer information about camera motion from it. Translations of camera 100 in one or more axes may be measured and monitored, preferably using one or more accelerometers.

In another example embodiment, camera motion is detected by analysis of preliminary photographs, for example images used for live view. Changes in the scene, as detected by the image analysis, are assumed to be the result of camera motion. The image analysis may include computing a correlation between images taken at different times, detecting changes in scene brightness between images taken at different times, analyzing motion vectors produced by a compression algorithm such as MPEG-4, or any combination of these and other kinds of image analysis.

For the purposes of this disclosure, the collective term "capture parameters" will be used to include focus settings, exposure settings such as an exposure time or a lens aperture setting, or other settings that a camera may use in taking a photograph. The ultimate photograph that is taken using the selected capture parameters will be called a "final" photograph in order to distinguish it from preliminary images a camera may take in order to determine capture parameters or to provide a live view display.

Figure 4:
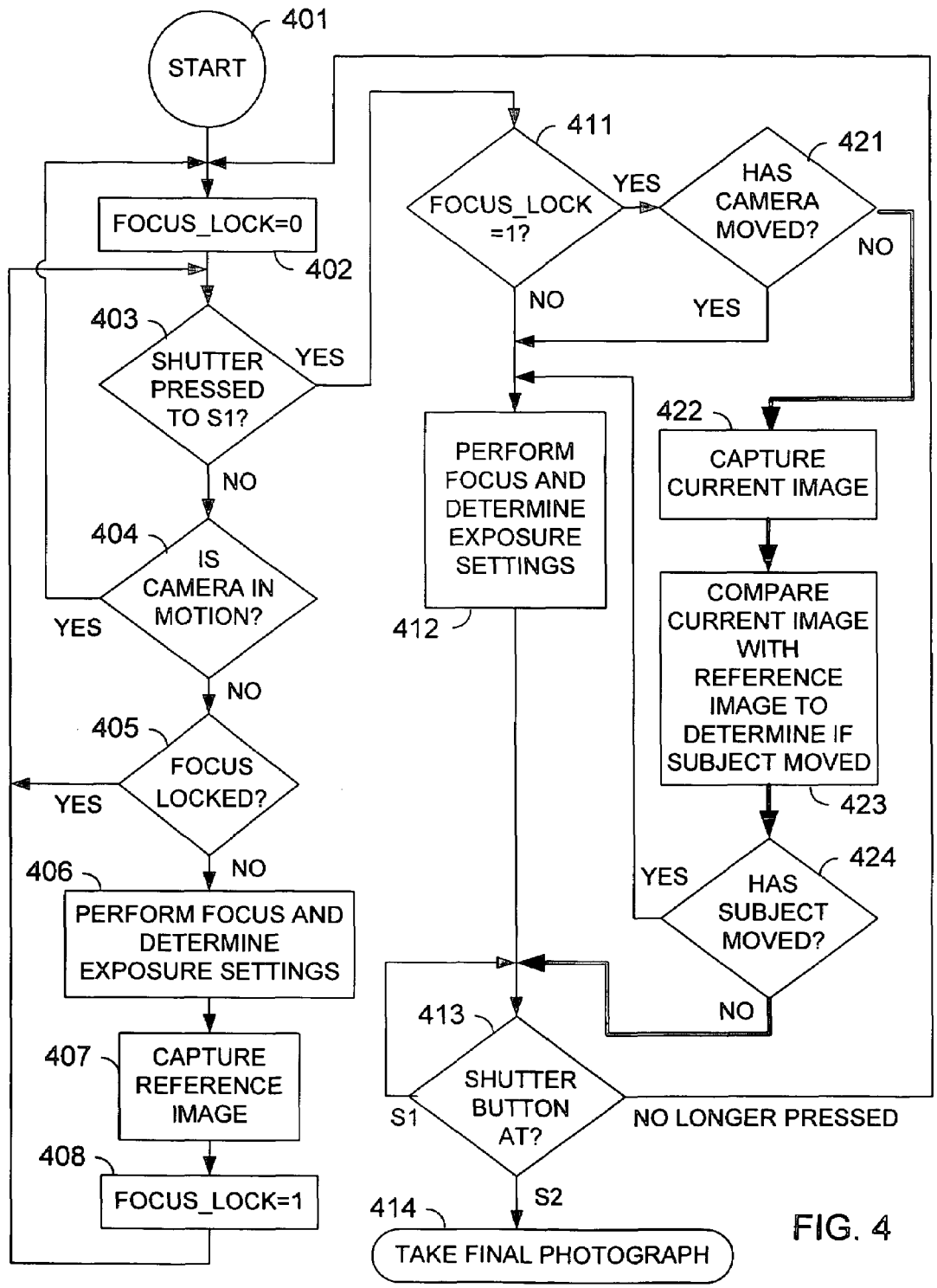
FIG. 4 shows a flowchart of a method in accordance with an example embodiment of the invention.

FIG. 4 shows a flowchart of a method 400 in accordance with an example embodiment of the invention. In this example embodiment, method 400 is performed under the control of logic 110 comprised in camera 100. At step 401, the method begins. Method 400 preferably occurs while a camera user is composing and taking a final photograph, and may begin when the camera's live view begins. Live view is often instigated by one of user controls 112. At step 402, the variable FOCUS_LOCK is initialized to zero. This has the effect of setting a flag indicating that the current camera status is that focus is not locked. FOCUS_LOCK may be stored, for example, in a bit, byte, or other unit of memory 111. At step 403, a check is made to see if an indication has been received that a photograph is to be taken imminently, namely that the shutter button has reached the S1 position. If S1 has not been reached, control passes to step 404 where a check is made to see if camera 100 is in motion. The check may be made, for example, by examining angular position signal 304, or by image analysis. If camera is in motion, control passes back to step 402. In other words, steps 402-403 are traversed repeatedly until either camera 100 is substantially still or S1 is reached.

The determination of whether camera 100 is in motion may be performed in any of several ways. In one example method, the camera may be determined to be in motion if its rotational velocity in any axis, as measured by motion sensing module 114, exceeds a predetermined threshold, for example 1 degree per second. In another example method, camera 100 may be determined to be in motion if it has rotated about any axis by more than a predetermined amount since the camera position was last checked in step 404. In another example embodiment, camera 100 may be determined to be in motion if a correlation coefficient computed between two live view images exceeds a predetermined value. In another example embodiment, camera 100 may be determined to be in motion if the change in scene brightness between two live view images exceeds a predetermined threshold. Many other criteria for determining whether camera 100 is in motion may be envisioned, and a camera designer may select a method and appropriate threshold amounts depending on the capabilities and intended use of the camera. The camera need not be truly motionless to be determined as substantially still, or no longer in motion. For the purposes of this disclosure, the camera is not in motion, or is substantially still, when it is truly motionless or when its motion is small enough to be ignored, for example below a threshold amount as discussed above.

If camera 100 is determined at step 404 to be no longer in motion, control passes to step 405, where the state of FOCUS_LOCK is checked. If focus is locked, control passes back to step 403. But if focus is not locked, control passes to step 406 where some capture parameters are selected. Namely, automatic focus is performed and the proper exposure settings are determined. Next, at step 407, a reference image is taken for later use. This reference image may be but need not be taken at the camera's full resolution. For example, the image taken at step 407 may be a frame of the live view display. Then, at step 408, FOCUS_LOCK is set to 1, preferably by storing in memory an indication that at least one capture parameter has been selected. (Note that capture parameters other than focus may also be "locked".) Control then passes back to step 403.

If at step 403 it is determined that S1 has been reached, control passes to step 411, where the status of FOCUS_LOCK is checked. Note that the result of the test of step 403 is considered to be "yes" if the user partially depresses the shutter button, stopping at S1, or if the user fully depresses the shutter button, traversing S1 rapidly and proceeding immediately to S2. If focus is not locked, control passes to step 412 where focus is performed and exposure settings are determined. Control then passes to step 413, where the status of the shutter button is checked. Control remains at step 413 if camera 100 is still in the S1 state. If S2 has been reached, a final photograph is taken at step 414, and if the shutter button is no longer pressed at all, control passes back to step 402.

If focus is found at step 411 to be locked, this is an indication that focus has already been performed before S1 was reached, and control passes to step 421, where the state of camera motion is checked. If the camera has moved, as indicated by motion sensing module 114, control passes to step 412 where the capture parameters are re-selected. That is, in this example, focusing is performed and exposure settings determined again. The determination of whether the camera has moved may be done in any of a number of ways. For example, the angular change in position since focus was performed at step 406 could be determined and compared with a threshold amount, for example three degrees. If the difference exceeds the threshold amount, it may be determined that the camera has moved. A camera designer may select an appropriate threshold amount based on the maximum amount of motion that can occur that will still result in an acceptable, in-focus image. This acceptable amount of motion will depend on various camera parameters such as the sensor pixel size, the current aperture setting, and the current zoom setting.

If at step 421 it is determined that the camera has not moved, the opportunity arises to avoid a substantial portion of the shutter lag that might otherwise occur. In this case, control passes to step 422 where a current image is captured. This image may be but need not be taken at the camera's full resolution, and may be, for example, a live view frame. This current image is compared at step 423 with the reference image taken previously at step 407 to see if the subject has moved substantially since focus was locked. The comparison is preferably done using well-known correlation techniques, although other methods may be used as well. It is assumed that any change in the image is due to subject motion because this method step would not have been reached if the camera had moved. Perfect correlation is not required to determine that the subject has not moved. If the subject has moved, as decided at step 424, then it is assumed that a re-selection of the capture parameters is necessary and control passes to step 412. But if the subject has not moved, then the focus and exposure settings determined at step 406 are still correct for the scene, and these operations need not be performed again. Control passes directly to step 413, bypassing step 412 and saving significant time. The sequence of steps 422, 423, and 424 can be performed considerably more quickly than performing focus and determining exposure settings, such as in step 412. This example time-saving sequence is indicated by the bold connector lines in the flow chart of FIG. 4. Note that at least some of these steps, for example comparison steps 407, 422, 423, and 424, may not need to be performed at all if camera motion is detected by analysis of preliminary images.

In accordance with example method 400, shutter lag is significantly reduced at least when 1) the user aims the camera at the scene to be photographed and holds the camera relatively steady long enough for focus to occur before S1 is reached, and 2) the subject does not move after focus has been locked before S1. This is a common photo-taking sequence. Some time-consuming operations, for example focus and exposure determination, are performed before the shutter button is pressed and therefore do not contribute to shutter lag. Because these operations are performed only as needed, battery energy is conserved.

While the examples thus far have described the invention as being embodied in or performed by a digital camera, it will be recognized that the invention could be embodied in or performed by other digital imaging devices as well, for example an image-enabled cellular telephone, a video camera, an image-enabled personal digital assistant, or some other digital imaging device.

The invention claimed is:

1. A method of reducing shutter lag, comprising:
   at a time before an indication that a photograph is to be taken imminently, selecting at least one capture parameter of a digital imaging device when it is determined that the digital imaging device is substantially still; and
   locking the at least one capture parameter so long as the digital imaging device remains substantially still; and
   when an indication that a photograph is to be taken imminently is received with the capture parameter locked, determining whether a photographic subject has moved since the capture parameter was selected before the indication was received; and
   re-selecting at least one capture parameter if the subject has so moved.

2. The method of claim 1, wherein the selecting at least one capture parameter further comprises one or more of performing automatic focus and determining at least one exposure setting.

3. The method of claim 1, wherein the determination that the digital imaging device is substantially still is based on a signal from a motion sensing module.

4. The method of claim 1, wherein the determination that the digital imaging device is substantially still is made based on analysis of preliminary photographs.

5. The method of claim 1, wherein the indication that a photograph is to be taken imminently is the reaching of an S1 state.

6. The method of claim 1, further comprising:
   before an indication that a photograph is to be taken imminently, re-selecting the at least one capture parameter when it is determined that the digital imaging device has moved since the at least one capture parameter was last selected and that the digital image device has once again become substantially still.

7. The method of claim 1, wherein determining whether the photographic subject has moved further comprises comparing a reference image taken before the indication was received with a current image taken after the indication is received.

8. The method of claim 1, wherein the digital imaging device is a camera.

9. A digital imaging device, comprising:
   a shutter button having an S1 position and an S2 position;
   memory; and
   logic, the logic configured to
      sense motion of the digital imaging device before S1 is reached;
      determine, based on the sensed motion, that the digital imaging device is substantially still;
      select at least one capture parameter upon determining that the digital imaging device is substantially still; and
      store in the memory an indication that the at least one capture parameter has been selected;
      when the S1 position is reached and the indication has been stored in memory that the at least one capture parameter has been selected:
         determine that the digital imaging device has not moved since the at least one capture parameter was selected before S1 was reached;
         determine that a photographic subject has not moved since the at least one capture parameter was selected before S1 was reached;
         detect that the S2 position has been reached; and upon these determinations, take a final photograph without re-determining the at least one capture parameter.

10. The digital imaging device of claim 9, further comprising a lens that projects an image of a scene onto a sensor, the lens being automatically focusable, and wherein the at least one capture parameter comprises a focus setting for the lens.

11. The digital imaging device of claim 9, and wherein the at least one capture parameter comprises an exposure setting.

12. The digital imaging device of claim 9, wherein the digital imaging device is a camera.

13. The digital imaging device of claim 9, wherein the logic senses motion of the digital imaging device by analyzing preliminary photographs.

14. The digital imaging device of claim 9, further comprising a motion sensing module that produces a signal indicating motion of the digital imaging device, and wherein the logic senses motion of the digital imaging device by monitoring the motion indicating signal.

15. The digital imaging device of claim 9, the logic further configured to, before the S1 position is reached:
   determine that that digital imaging device has moved and once again become substantially still; and
   upon the determination that the digital imaging device has moved and once again become substantially still, re-determine the at least one capture parameter.

16. A digital camera, comprising:
an electronic array light sensor;
a lens that projects an image of a scene onto the electronic array light sensor; a shutter button having an S1 and an S2 position;
logic, the logic configured to, before the S1 position is reached,
   sense motion of the camera;
   perform automatic focus of the lens when it is determined, based on the sensed motion, that the camera is substantially still; and
   re-perform automatic focus only upon a determination that the camera has moved since automatic focus was last performed and that the camera has once again become substantially still;
after the S1 position is reached, take a final photograph without re-performing automatic focus upon a determination that:
   automatic focus was performed before S1 was reached;
   the camera has not substantially moved since automatic focus was performed before S1 was reached; and
   a photographic subject has not substantially moved since automatic focus was performed before S1 was reached; and
   the S2 position has been reached.

17. The camera of claim 16, the logic further configured to, after the S1 position is reached, take a final photograph without re-performing automatic focus upon a determination that:
   automatic focus was performed before S1 was reached; and
   the camera has not substantially moved since automatic focus was performed before S1 was reached; and
   the S2 position has been reached.

\* \* \* \* \*

UNITED STATES PATENT AND TRADEMARK OFFICE
CERTIFICATE OF CORRECTION

PATENT NO. : 7,620,304 B2 Page 1 of 1
APPLICATION NO. : 11/410703
DATED : November 17, 2009
INVENTOR(S) : Joel B. Larner et al.

It is certified that error appears in the above-identified patent and that said Letters Patent is hereby corrected as shown below:

In column 6, line 47, in Claim 9, after "to" insert -- , --.

In column 7, line 22, in Claim 15, delete "that that" and insert -- that the --, therefor.

Signed and Sealed this

Ninth Day of March, 2010

David J. Kappos
*Director of the United States Patent and Trademark Office*